United States Patent
Yamada

(10) Patent No.: US 7,359,510 B2
(45) Date of Patent: Apr. 15, 2008

(54) INFORMATION RECORDING/REPLAYING APPARATUS AND METHOD

(75) Inventor: Masahiro Yamada, Nishitama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 786 days.

(21) Appl. No.: 10/359,172

(22) Filed: Feb. 6, 2003

(65) Prior Publication Data

US 2003/0152223 A1 Aug. 14, 2003

(30) Foreign Application Priority Data

Feb. 8, 2002 (JP) ............................. 2002-032781

(51) Int. Cl.
*G06F 12/14* (2006.01)

(52) U.S. Cl. ...................... 380/201; 380/284; 380/239; 380/258; 713/193

(58) Field of Classification Search ................ 380/201, 380/284, 239, 258; 713/193
See application file for complete search history.

(56) References Cited

U.S. PATENT DOCUMENTS 6,289,102 B1 * 9/2001 Ueda et al. .................. 380/201
6,477,649 B2 * 11/2002 Kambayashi et al. .......... 726/27
6,819,765 B1 * 11/2004 Kori ............................. 380/203

FOREIGN PATENT DOCUMENTS

| JP | 6-4996 | 1/1994 |
|---|---|---|
| JP | 7-130147 | 5/1995 |
| JP | 8-36803 | 2/1996 |
| JP | 8-77706 | 3/1996 |
| JP | 09-326166 | 12/1997 |
| JP | 11-283327 | 10/1999 |
| JP | 2001-077802 | 3/2001 |
| JP | 2001-351323 | 12/2001 |
| JP | 2002-191039 | 7/2002 |
| JP | 2002-203367 | 7/2002 |

OTHER PUBLICATIONS

Japanese Office Action for Japanese Patent Application No. 2002-032781 dated Oct. 5, 2004.

* cited by examiner

*Primary Examiner*—Kambiz Zand
*Assistant Examiner*—Tongoc Tran
(74) *Attorney, Agent, or Firm*—Pillsbury Winthrop Shaw Pittman, LLP

(57) ABSTRACT

A content including replay condition information is encrypted using first key information while being recorded to a recording medium. The first key information is encrypted using the replay condition information and second key information while being recorded to the recording medium together with the replay condition information. The replay condition information and the first key information are read from the recording medium, and the first key information is decrypted using the replay condition information and the second key information. The content read from the recording medium is decrypted using the decrypted first key information.

18 Claims, 4 Drawing Sheets

Recording content

| Transferred | Not-transferred yet |
|---|---|

A　　　　　　　　　　　　　　B　　　　　　　　　　　　C

Recording content
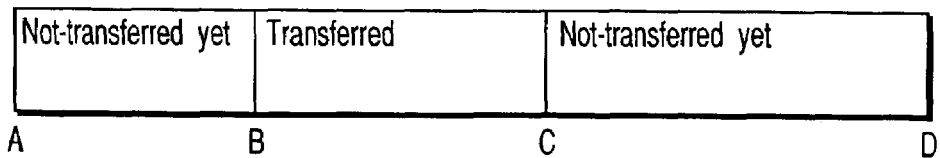
FIG. 4
Recording content
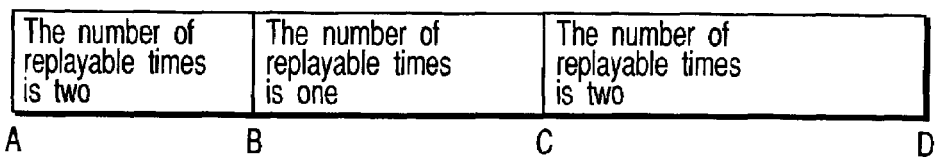
FIG. 5
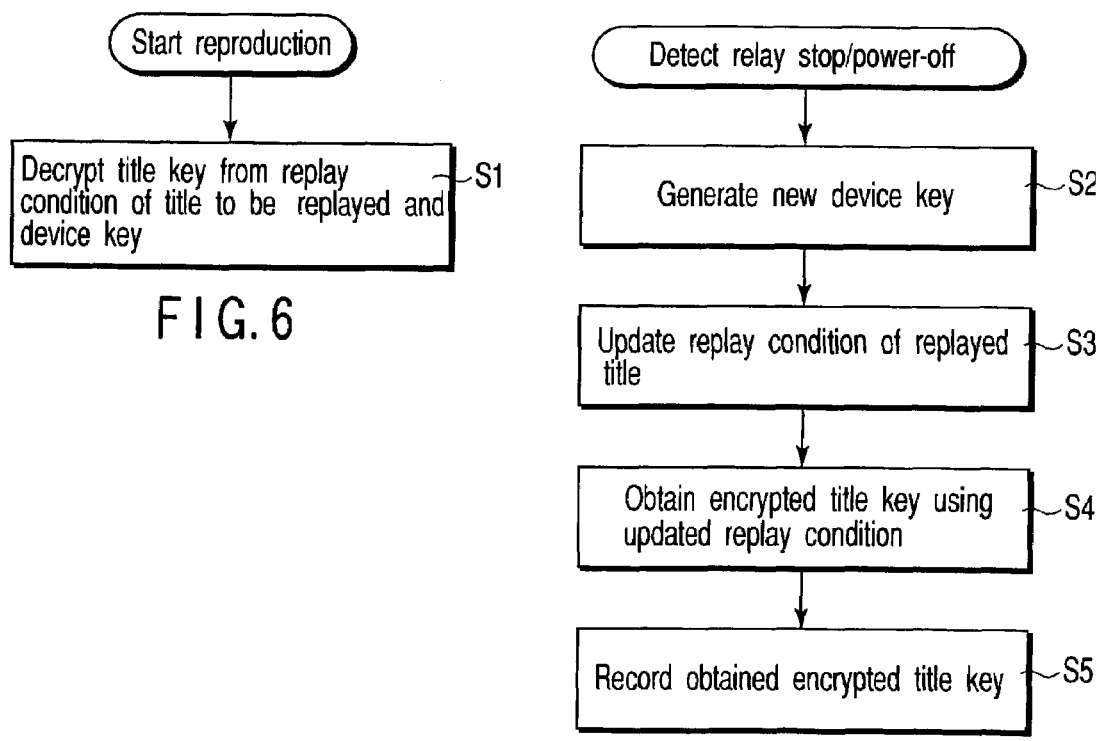
FIG. 6
FIG. 7

INFORMATION RECORDING/REPLAYING APPARATUS AND METHOD

CROSS-REFERENCE TO RELATED APPLICATIONS

This application is based upon and claims the benefit of priority from the prior Japanese Patent Application No. 2002-032781, filed Feb. 8, 2002, the entire contents of which are incorporated herein by reference.

BACKGROUND OF THE INVENTION

1. Field of the Invention

The present invention relates to information recording/replaying apparatus and method. In particular, the present invention is effective when recording broadcast content to a hard disk, and transferring the content recorded on the hard disk to other recording media. This serves to improve easy handling for users, while protecting the copyright of the broadcast content.

2. Description of the Related Art

As is well known, in broadcasting, content having copy-once copyright information (copy once: one-time copy is permissible) is used. Copy-once means that the content is permitted to be recorded to a recording medium by only one generation.

The content having copy-once copyright information is not permitted to be recorded on other media when it is received by an HDD (Hard Disk Drive) built-in receiver and recorded to a hard disk. In this case, the content recorded to the hard disk has copy-no-more copyright information (copy-no-more: copy is not permissible).

Incidentally, HDDs are easy to handle because the access speed is high; however, they have a limited recording capacity. In order to effectively use the limited recording capacity, the user has the following needs. That is, the user desires to transfer the content to be saved for a long period to individual media such as a DVHS (Digital Video Home System).

In order to meet the above user needs, the following function is considered. Under the condition that the content recorded to the hard disk is erased, the recorded content is replayed from the hard disk, and the replayed content is recorded to other media. This function is called "move".

Content transfer from a hard disk to a DVHS is carried out in the following manner. Apparatuses first recording the content, that is, an HDD built-in receiver, temporarily reproduces the corresponding content from the hard disk, thereafter, records the replayed content to the recording media such as DVHS.

Incidentally, when the HDD built-in receiver records the content, in order to prevent illegal copy, the following processing is carried out in general. That is, the content is encrypted, thereafter, recorded to the hard disk.

For this reason, if the encrypted content is read from the hard disk and is recorded to the recording media by the DVHS, it is impossible to reproduce the content by the apparatus recording it.

Thus, when replaying the encrypted content from the hard disk, the content must be outputted to the DVHS after the cipher is decrypted. In this case, IEEE 1394 (Institute of Electrical and Electronics Engineers) is used as a read signal transmission line. Further, the content is protected using a protection mechanism such as DTCP (Digital Transmission Content Protection).

If the replaying work is interrupted during content transfer from the hard disk to the DVHS, the content portion already recorded to a recording medium by the DVHS must be erased from the hard disk. This is to prevent the content portion recorded to the recording medium from being again replayed and recorded to another recording medium.

In the broadcast technique, there is the case where the HDD built-in receiver records the content, thereafter; a content having a limitation in the number of replaying and seeing/hearing times is broadcasted. As described above, when the content has limitation in the number of replaying times, the HDD built-in receiver records and manages already replayed time condition information and replayable time condition information in the hard disk.

When the number of replayable times represented by the time condition information is one or more, the HDD built-in receiver makes a replaying limitation based on the above time condition information so that the content can be replayed.

In the broadcast technique, there is the case where copyright information is given to the broadcasted content. In this case, the HDD built-in receiver also records the copyright information to the hard disk.

In such a case, in order to prevent the copyright information from being altered, the following method has been proposed. That is, the copyright information is included as a cipher key for encrypting the corresponding content in an operation element generating the cipher key. According to the above method, if the recorded copyright information is altered, a decryption key for decoding the content is correctly found; therefore, it is possible to prevent illegal alteration of the copyright information.

The HDD has a function of backing up the content recorded to the hard disk in the HDD before transferring it, and restoring the backup data after transfer. As a result, it is difficult to securely erase the content and key information. In order to solve the problem of erasing the key information by the above backup restoration, there has been proposed a method of storing the key information outside of the HDD.

More specifically, in the conventional case, the whole contents are encrypted using one cipher key, and thereby, are protected. For this reason, when the content transfer is interrupted halfway, all the contents must be erased in order to make impossible the replay of the content portion already transferred.

In this case, however, there is a problem that the non-transfer portion of the content is neither replayed nor transferred later. The transfer interruption is probably caused not only user's will but also accidental power-off. In this case, necessary portions of the contents are lost regardless of the user's will.

In order to securely erase the content equivalent to already transferred portions from the hard disk using the conventional method, the following method is employed. For example, the cipher key of the content is changed in one-minute units, and then, the use of a key for the replayed portion is inhibited. However, according to the above method, 120 keys must be prepared for 120-minute content; for this reason, there is a problem that key data management is very difficult.

Further, there has been proposed the following method. That is, a key value changing every minute is set as a value obtained from only previous one-minute keys of the content by an operation, and only the key value just as transfer is completed is stored. By doing so, there is no need of acquiring keys relevant to the transferred content portions; therefore, the number of keys can be reduced.

This is a method that is effective in reducing the number of keys and preventing the transferred content from being again replayed. However, when making content random access replay, in order to calculate the key value at the replay start time, there is a need of calculating all keys every minute from the content start time to the replay start time. For this reason, when replaying the content while jumping it, there is a problem that this operation must be performed according to the distance from the header of the content to the replay start position thereof.

When the copyright information has a content replaying time limitation, the number of replaying times is updated every time the content is replayed. For this reason, according to the method of including the copyright information in the content cipher key, the content must be again encrypted upon every replay.

When the content replay is interrupted halfway, there is a problem that the number of replayable times from the content start time to the completion time reduces accordingly.

BRIEF SUMMARY OF THE INVENTION

One embodiment may provide an information recording/replaying apparatus and method, which can prevent a transferred content portion from being again transferred when content transfer is interrupted.

According to one aspect of the present invention, there is provided an information recording/replaying apparatus comprising:

a first recording section for encrypting a content with a first key and recording the encrypted content;

a second recording section for calculating the first key using conditions for replaying the content and a second key and recording the first calculated key;

a first replaying section for reading the conditions for replaying the content and the first calculated key and calculating the first calculated key using the conditions for replaying the content and the second key; and a second replaying section for reading the encrypted content and decrypting the encrypted content using the first key calculated by the first replaying section.

According to one aspect of the present invention, there is provided an information recording/replaying method comprising:

encrypting a content with a first key;

recording the encrypted content;

encrypting the first key using conditions for replaying the content and a second key;

recording the first encrypted key;

reading the conditions for replaying the content and the first encrypted key;

decrypting the first encrypted key using the conditions for replaying the content and the second key;

reading the encrypted content; and decrypting the encrypted content using the first key decrypted by the decrypting the first encrypted key.

BRIEF DESCRIPTION OF THE SEVERAL VIEWS OF THE DRAWING

FIG. 4 is a view to explain another example of transferred and non-transfer portions of the content recorded to a hard disk in the embodiment;

FIG. 5 is a view to explain another example of transferred and non-transfer portions of the content recorded to a hard disk in the embodiment;

FIG. 6 is a flowchart to explain the operation when the hard disk starts replay in the embodiment;

FIG. 7 is a flowchart to explain the operation when the hard disk stops the replay in the embodiment;

DETAILED DESCRIPTION OF THE INVENTION

One embodiment of the present invention will be described below in detail with reference to the accompanying drawings.

Figures 1, 2:
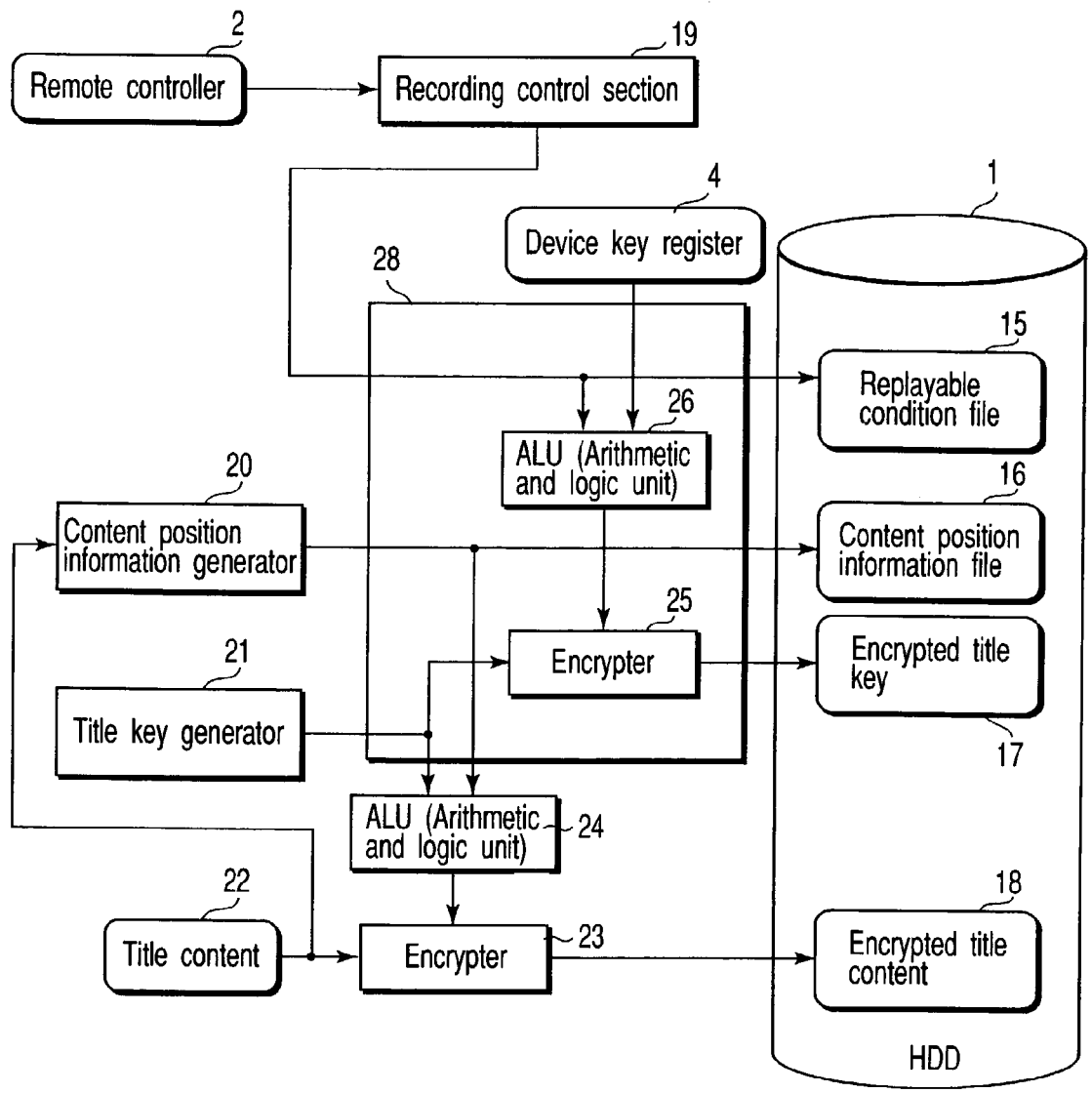
FIG. 1 shows one embodiment of the present invention, and is a block diagram to explain the configuration of an information recording section of a recording/replaying apparatus.
FIG. 2 is a view to explain one example of transferred and non-transfer portions of a content recorded to a hard disk in the embodiment.

FIG. 1 shows an information recording section of the recording/replaying apparatus for recording/replaying the content to the hard disk. In this case, a broadcasting content having copy once, that is, only one-generation recordable copyright information is received.

The content reception may be carried out via a tuner or demodulator conformable to BS (Broadcasting Satellite) digital broadcast, or a transmission line conformable to an IEEE 1394 interface. A video signal of the broadcast content is compressed in the MPEG (Moving Picture Experts Group) format.

In the digital broadcast, the broadcast content may be the MPEG 2 transport stream format. In this case, a plurality of contents is multiplexed into one stream; for this reason, there is the case where individual contents have different copyright information. Further, there is the case where the plurality of contents has copy-once copyright information.

The following conditions are given depending on the copyright information. That is, after the content is recorded to the hard disk, copy is possible by preset limited times, and only seeing/hearing action is permitted when the number of copy times exceeds the limited times. Also, only seeing/hearing action is permitted by a limited number of times. There are 2 types of number of times. One is for possible copy times. Second is for possible seeing/hearing times. The replaying information may have both of two or one of them. If the number of copy times is 2, this allows to make total 2 copies of the contents.

A recording control section 19 controls the operation when the content is recorded. The recording control section 19 receives a recording start instruction from the user via a remote controller 2.

A content position information generator 20 comprises a timer, which counts seconds, and a counter, which counts the data blocks of recorded content. The content position information generator 20 generates content position information showing when the data of which portion of the received content is received, in units of seconds. The content position information is recorded to an HDD 1 as a content position information file 16.

A title key generator 21 generates a cipher key initial data for encrypting/recording a title content 22 when recording of the title content 22 is newly started.

The above recording control section 19 records information showing a content recording start time to a replayable condition file 15 of the HDD 1 as a replayable condition. The replayable condition may include information showing a replay start enable time, or information showing the header position of replay start enable data. In addition, the replayable condition may include information showing the number of replayable times.

FIG. 2 shows the content recorded to the hard disk. In FIG. 2, a reference letter A denotes the recording start time point. The replayable condition recorded to the hard disk in recording is information representing the above time point A. When the plurality of contents is multiplexed in the transport stream, individual contents may have independent replayable conditions.

An arithmetic and logic unit (hereinafter, referred simply to as ALU) 24 outputs the result adding the output of the content position information generator 20 and the output of the title key generator 21 as a content cipher key used in an encrypter 23.

An encrypter 23 encrypts the title content 22 using the content cipher key, and thereafter, records it to the HDD 1 as encrypted title content 18. In this case, if the title content 22 has copy-once copyright and number of copy times is 1 information, the copyright information is changed into a copy-no-more state, and thereafter, is recorded to the HDD 1.

A device key register 4 stores device keys having different values for each recording/replaying apparatus. The device keys are stored in a ROM (Read Only Memory) or EEP (Electrically Erasable and Programmable) ROM to prevent the keys from being rewritten by the user. In this case, however, the device keys may be stored in the HDD 1 and not in the register, if measures such as encrypted are taken.

In the device keys, the value of the device key register 4 is not directly used, but an encrypted title key 17 stored in the HDD 1 may be used after being decrypted by the value of the device key register 4.

An ALU 26 adds the device key, replayable condition value or its hash value. An encrypter 25 encrypts the title key generated by the title key generator 21 using the value obtained from the above operation. The encrypted title key is recorded to the HDD 1 as the encrypted title key 17.

Here, a function C_E (k, d) has the definition of encrypting data d using a key k, and a function C_D (k, d) has the definition of decrypting the data d using the key k. Kd is defined as a device key, Kte is defined as an encrypted title key, and Kt is defined as a title key, which is not encrypted or is decrypted, or a key generated by the title key generator 21.

The operation for obtaining the encrypted title key Kte is expressed by the following equation using the above definition.

$$Kte = C\_E \ (Kd + \text{replayable condition value}, Kt)$$

Figure 3:
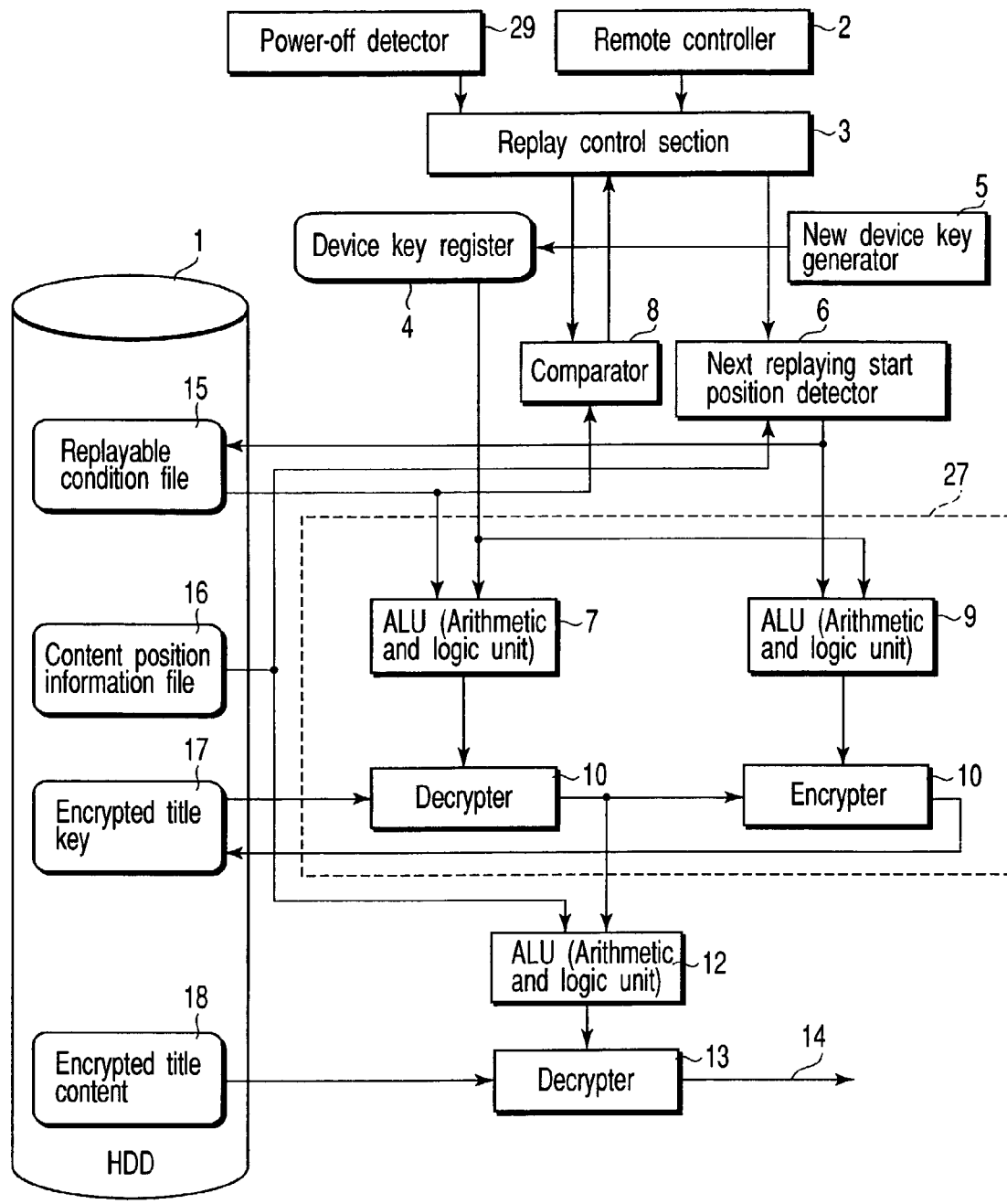
FIG. 3 is a block diagram to explain the configuration of an information replaying section of the recording/replaying apparatus in the embodiment.

FIG. 3 shows an information replaying section of the above recording/replaying apparatus. A replay control section 3 controls the operation in replaying. The replay control section 3 receives a replay start instruction and the replay start position instruction from the user when the user operates the remote controller 2.

If hard disk replay includes content transfer to DVHS, when replaying the content having copy-no-more copyright information, only the content portion that is still not transferred to the DVHS must be replayed. After the contents that was transferred to the DVHS, it can not be replayed if the number of copy times is 0.

In the stream multiplexing the plurality of contents, replay is permitted with respect to only the content portion that is still not transferred to the DVHS, for individual contents.

Moreover, there exit contents permitting seeing/hearing action only a limited number of times. In this case, replay for copy and seeing/hearing action is permitted with respect to only the content portion having the condition that the number of copy and seeing/hearing times is one or more.

A comparator 8 reads a replayable range included in the replayable condition given to the content to be transferred from the HDD 1, and compares the range with the replay start position included in the replay start instruction inputted by the user.

When simultaneously transferring the plurality of contents, the comparator 8 makes a comparison with respect to individual contents. Further, the comparator 8 makes a comparison as to whether or not the number of replayable times of the portion to be replayed is one or more.

If the instruction from the user diverges from the replayable range, or if the number of replayable times is zero, the result is returned to the replay control section 3. In this case, the replay control section 3 rejects the replay instruction from the user.

As a result, the replay control section 3 does not carry out the operation control of ALUs 7 and 12, decrypters 10 and 13, the read control of the HDD 1, etc. In this case, the replay control section 3 displays a message "Cannot reproduce because the content has been already transferred", using a display screen. Simultaneously, the corresponding contents name may be displayed on the display screen.

When replaying the content recorded to the hard disk for the first time, the replayable condition shows that the content at all time points from recording start to recording completion is replayable. Therefore, it is possible to reproduce an arbitrary time point of the content recorded to the hard disk.

The ALU 7 reads the device key from the device key register 4, and makes an operation using the replayable condition value read from the HDD 1 or its hash value.

The decrypter 10 decrypts the encrypted title key 17 read from the HDD 1 using the output of the ALU 7.

The decryption title key Kt obtained from the decrypter 10 is expressed by the following equation.

$$Kt = C\_D \ (Kd + \text{replayable condition value}, Kte)$$

The replay control section 3 reads the content position information file 16 from the HDD 1 based on the replay start position from the user obtained via the remote controller 2.

If the instruction from the user is given in the time format, the replay control section 3 determines where data equivalent to the replay start position exists, using the data of the content position information file 16. Then, the replay control section 3 reads the encrypted title content 18 from the HDD 1.

The ALU 12 carries out the operation of the data of the content position information file 16 read from the HDD 1 and the output of the decrypter 10. The decrypter 13 decrypts the encrypted title content 18 read from the HDD 1 using the output of the ALU 12, and thereafter, outputs the decrypted content to a terminal 14.

In general, if the position information is altered, when reading a designated position content, the content shifted from the designated position is read. By doing so, the position is falsified; for this reason, the content portion, which might not be replayed, is illegally replayable. However, the content cipher key is encrypted using the position information; therefore, it is possible to prevent the above illegal replay.

If the replay is carried out for the purpose of seeing/hearing, the content outputted from the terminal 14 is reconstructed into a video signal by an MPEG decoder, and thereafter, is displayed on a display device.

If the replay is carried out for the purpose of recording the content to the DVHS, the content outputted from the terminal 14 is sent via an IEEE 1394 interface, and thereafter, is transmitted to an IEEE 1394 transmission line.

The following is a description of the case where the replay content has copy-no-more copyright information, and the replay instruction is a content transfer to recording apparatuses such as DVHS using the IEEE 1394 transmission line.

For example, when the hard disk replay is started and the replay content is recorded to the DVHS, the user gives an instruction to stop the replay via the remote controller 2. In this case, the content portion up to the replay completion time point must be erased from the HDD 1 or must be non-producible.

FIG. 2 shows the case where replay is started from the header of the recording content, and is stopped halfway. In this case, the replay start position designated by the user is the header A of the recording content, and the replay stop position is B. The transferred portion is the recording content from A to B, and the above portion must not be transferred. A non-transfer portion, that is, the recording content from B to C is transferable.

FIG. 4 shows the case where replay is started from the halfway portion of the recording content, and is stopped halfway. In this case, the replay start position designated by the user is B after the header A of the recording content, and the replay stop position is C. The transferred portion is the recording content from B to C, and the above portion must not be transferred. The recording content portions from A to B and from C to D are non-transfer portions, and therefore, are transferable.

FIG. 5 shows the case where replay is started from the halfway portion of two-times replayable recording content, and is stopped halfway. In this case, the replay start position designated by the user is B after the header A of the recording content, and the replay stop position is C. In the recording content portion from B to C, the number of remaining replayable times is one time; therefore, the content portion is replayable one more time. The recording content portions from A to B and from C to D are replayable two more times.

At the time when the replay is stopped, information showing that time or time near to there is recorded to the HDD 1 while being included in the replayable condition. Considering the cases shown in FIG. 4 and FIG. 5, the replayable condition may include both replay stop position and start and completion time points of all replayable portions. In FIG. 5, all positions A, B C and D and the number of replayable times of individual segments may be included.

By doing so, even if only a halfway portion of the contents is transferred, it is possible to reproduce the contents for the purpose of transferring all of the remaining transferable portions, and to reproduce portions, which have not been seen/heard yet, by initially given times.

The replayable condition value already existing in the HDD 1 before replay is updated. If the above positions A, B C and D shown in FIG. 4 are included as the replayable condition, the comparator 8 makes the following comparisons when the replay start position designated by the user is set as G.

$A \leq G$
$G \leq B$
$C \leq G$
$G \leq D$

By doing so, the comparator 8 can determine whether or not each segment (content portion) is replayable. Further, the comparator 8 can determine whether or not the number of replayable times of each segment is one or more.

A new device key generator 5 generates a new device key, and records it to the device key register 4. The ALU 9 carries out the operation of the new device key and a detection value of a next replay start position detector 6 so as to generate a key. The encrypter 11 encrypts a title key decrypted by the decrypter 10 using the key obtained from the above operation, and records it to the HDD 1.

The reason why the hash value is used in the AULs 7 and 26 is as follows. This is, since the amount of data becomes larger when the replayable condition includes all points of the replayable content, the data type is related to the device key.

The encrypted title key Kte is obtained from the following equation using the definition described in FIG. 2.

$$Kte = C\_E\ (Kd + \text{replayable condition value}, Kt)$$

The device key is used not only for decoding the title key of the replaying content, but also for encrypting the title key of other stored contents. If the device key is only replaced with the new device key, the title key of the replayed content is newly found. In addition to the above key replacement, the title key of other stored contents is also decrypted by the device key before replaced with the new device key, and then, encrypted by the new device key, thereafter, stored in the HDD 1.

There is a case where recording stop occurs by power-off, and not the instruction from the user. Further, there is a case where power can be supplied to the recording/replaying apparatus while short time processing is executable after power is shut off.

In this case, the replay control section 3 receives a detection signal from a power-off detector 29, and executes processings such as the generation of the above new device key and title key encrypted and saving.

Unless the above processing is executed, the replayable condition is not updated, and the state before replay is held. As a result, the content can be replayed frequently. In this case, the processing such as the generation of the new device key and the title key encrypted are periodically carried out from the time when the content production is started.

The generation of the new device key may be executed only one time at the replay start time. In this case, the encrypted title key generated before the actual replay stop time is not recorded to the HDD capable of freely reading/writing, but recorded to an EEPROM, so that it cannot be reused later. Just before power is shut off, or when the power is again turned on, the encrypted title key at the replay stop time may be recorded to the HDD 1.

The timing executing the operation using the device key will be described below with reference to flowcharts. The replay control section 3 or recording control section 19 executes the processing.

FIG. 6 is a flowchart of the replay start time. When replay is started, the control section reads the encrypted title key 17, and decrypts it using the device key and the replay condition (S1).

FIG. 7 is a flowchart showing the procedure at the replay stop time. When the replay stop instruction is given from the user or power-off is detected, at that time, the control section generates a new device key (S2), and changes the replay condition of the replayed title (S3). Namely, the number of replayable times from the replay start time to the replay stop time is reduced one, or the replayed title is set as already transferred. As a result, the control section calculates an encrypted title key using the replay condition (S4), and records the obtained encrypted title key to the HDD 1 (S5).

In FIG. 7, when the replay is stopped by power-off, steps S2 to S5 must be executed after power-off is detected. However, there is a case where all of the above processings are not completed until the power is in a fully off state, depending on the configuration of the power supply circuit of the apparatus for executing them.

Figure 8:
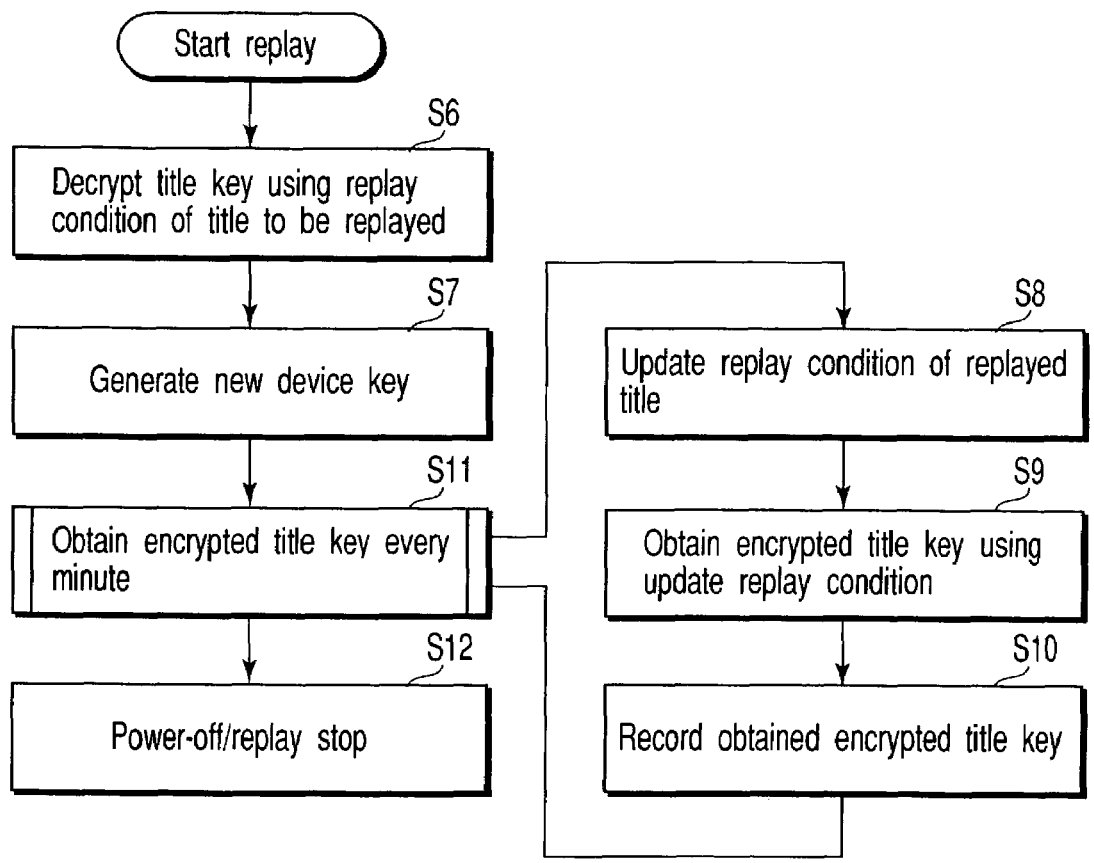
FIG. 8 is a flowchart to explain the operation when a power is off in the embodiment.

FIG. 8 shows the processing flow when nothing is done after power-off is detected. First, when replay is started, the control section decrypts the title key of the replaying title (S6), and generates a new device key (S7).

Thereafter, the procedures from steps S8 to S10 are repeated every minute (S11). More specifically, in step S8, the replay condition of the replayed title is updated. Namely, the control section determines where the replay is completed at that time, and the number of replayable times up to that time is reduced by one or the replayed title is set as already transferred.

In step S9, an encrypted title key is calculated using the replay condition obtained in step S8. In step S10, the encrypted title key obtained in step S9 is recorded to the EEPROM.

In this case, when all procedures including replay are stopped by the above power-off, the encrypted title key decodable by the new device key is not recorded to the HDD 1, and the encrypted title key is recorded to only the EEPROM.

In the HDD 1, the encrypted title key decodable by the device key (old device key), i.e., the key that is not updated by the new device key, remains. However, the old device key is erased at the replay start time; for this reason, the encrypted title key is not decodable, and as a result, it is not usable.

Figure 9:
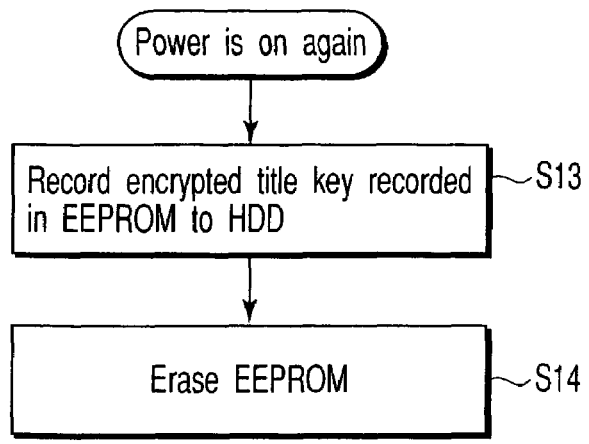
FIG. 9 is a flowchart to explain the operation when the power is on again in the embodiment.

Thereafter, when power is turned on again, the procedure shown in FIG. 9 is carried out. First, the control section records the encrypted title key recorded in the EEPROM to the HDD 1 (S13), and thereafter, erases the encrypted title key recorded in the EEPROM (S14).

The device key is newly remade, and thereby, the replay condition before transfer and the encrypted title key are backed up. Therefore, even if the encrypted title key is restored after transfer, no device key before transfer exists, so that the encrypted title key can be prevented from being decrypted. As a result, it is possible to prevent illegal copy. As the case may be, the value obtained from the device key register 4 may be used without using the new device key.

There is a case where the user gives a replay instruction for transfer to the content already transferred to the DVHS as replay start and position designation information. In this case, the comparator 8 makes a comparison between the value of the replayable condition file 15 and the value read from the HDD 1. By doing so, from the comparison result, it is determined that the position to be replayed is a position inhibiting replay; therefore, it is possible to prevent copy. In the content having the number of replayable times already completed, the number of replayable times is zero; therefore, it is possible to prevent replay.

The following is a description of the case where the replayable condition file 15 is altered and returned to the header of the content already transferred to the DVHS, and the case where the number of replayable times is increased.

In this case, it is impossible to prevent illegal copy by the comparator 8. However, the value of the operation result by the ALU 7 is different from the case where a correct replay start enable position is given to the ALU 9. Thus, the decrypter 10 cannot correctly decrypt the encrypted title key. As a result, it is impossible to decrypt the content, and to finally prevent illegal copy.

If the content position information is altered, the operation result by the ALU 12 is not correctly obtained. Therefore, the content cannot be decrypted; finally, it is possible to prevent illegal copy.

The operation for the replay condition including copyright information is carried out, and thereby, the content cipher key is obtained. Therefore, even if the copyright information and the replay condition are changed, the operation is carried out at high speed as compared with the case of encrypting whole of the contents. As a result, even if the operation is started after replay is stopped or power is shut off, it is possible to complete the operation in a short time.

After power-off is detected, even if the time until a full power-off state is short, when the power is tuned on again, replay processing is possible according to the replay condition at the time power was shut off.

In the above description, the encrypted title key in the recording or replay stop time has been encrypted using the following equation.

$$Kte=C\_E\ (Kd+\text{replayable condition},\ Kt)$$

The title key in replaying has been decrypted by the following equation.

$$Kt=C\_D\ (Kd+\text{replayable condition},\ Kte)$$

According to another embodiment of the present invention, the encrypted title key in the recording or replay stop time may be encrypted by the following equations.

$$Kte=C\_E\ (Kd,\ Kt+\text{replayable condition})$$

$$Kte=C\_E\ (Kd,\ Kt)+H\ (\text{replayable condition})$$

$$Kte=C\_E\ (Kd,\ Kt+\text{replayable condition})+H\ (\text{replayable condition})$$

In this case, when restarting the interrupted transfer, the encrypted title key is decrypted by the following equations.

$$Kt=C2\_D\ (Kd,\ Kte)-\text{replayable condition}$$

$$Kt=C2\_D\ [(Kd,\ \{Kte-H\ (\text{replayable condition})\}]$$

$$Kt=C2\_D\ [(Kd,\ \{Kte-H\ (\text{replayable condition})\}]-\text{replayable condition}$$

As described above, the replayable condition including copyright information is included in the operation for obtaining the encrypted title key. By doing so, the encrypted title key is not decrypted when the copyright information and the replay condition are altered. Therefore, it is possible to prevent illegal copy by altering the copyright information and the replay condition.

In the above description, the content position information 16 has been used as data independent from the content data. In place of the above position information, data included in the content may be used. For example, MPEG transport stream includes time stamp information such as PCR (Program Clock Reference), PTS (Presentation Time Stamp) and DTS (Decoding Time Stamp) as time information. Thus, the above time stamp information may be used as the above position information.

In FIG. 1, when recording is started, the recording control section 19 extracts a PCR value near the replay start time from the title content 22 as the replayable condition, thereafter, writes it to the replayable condition file 15 as a time from which replay can be started. The above PTS and DTS values may be extracted.

In FIG. 3, the decrypter 13 decrypts the content using the output of the decrypter 10, and not the output of the ALU 12. When the replay instruction is given from the user, the comparator 8 reads the replayable condition file 15, and makes a comparison with the replay start time included in the replay start instruction.

The replay control section 3 reads the encrypted title content 18 from the HDD 1, and the decrypter 13 decrypts the read content. Further, the replay control section 3 makes a comparison between the PCR value included in the decrypted content and time to be replayed, thereafter, extracts and reproduces the content portion equivalent to the replay start time.

The replay control section 3 reads the encrypted title content 18 from the relationship between the header time of the content and data position, and extracts the PCR from there. Then, the replay control section 3 makes a comparison with the time to be replayed; as a result, it may stop the replay if non-correspondence is detected.

The above PCR, PTS and DTS are included in transport stream; therefore, the content is encrypted, and thereby, it is possible to prevent information from being altered.

By doing so, it is possible to prevent illegal replay by the process of shifting the relationship between the content time and the replay condition file.

In the above embodiments, the content replay includes simple data transfer and read for copy in addition to the replaying method of actually replaying pictures.

What is claimed is:

1. An information recording/replaying apparatus comprising:
a first recording section for encrypting a content with a first key and recording the encrypted content;
a second recording section for calculating the first key using conditions for replaying the content and a second key and recording the first calculated key;
a first replaying section for reading the conditions for replaying the content and the first calculated key and calculating the first calculated key using the conditions for replaying the content and the second key;
a second replaying section for reading the encrypted content and decrypting the encrypted content using the first key calculated by the first replaying section; and
a first control section for updating the conditions for replaying the content based on the result replaying the content by the second replaying section and calculating the first key calculated by the first replaying section to the first calculated key again using updated conditions for replaying the content.

2. An information recording/replaying apparatus according to claim 1, wherein the encrypted content by the first recording section and the first calculated key by the second recording section are recorded to a first recording medium.

3. An information recording/replaying apparatus according to claim 1, wherein the conditions for replaying the content includes at least one of information showing segment or position of the content and information showing the number of replayable times of the content.

4. An information recording/replaying apparatus according to claim 1, wherein the first control section calculates the first key calculated by the first replaying section to the first calculated key again using updated conditions for replaying the content and a third key instead of the second key.

5. An information recording/replaying apparatus according to claim 1, wherein the first recording section generates position information of the content and encrypts the content using the first key and the position information, and the second replaying section decrypts the encrypted content using the first key calculated by the first replaying section and the position information.

6. An information recording/replaying apparatus according to claim 1, further comprising; when the content is stream data including time information, a third control section for comparing information showing a replaying request position of the stream data with the time information included in the stream data decrypted by the second replaying section so that an output of the stream data can be limited.

7. An information recording/replaying apparatus comprising:
a first recording section for encrypting a content with a first key and recording the encrypted content;
a second recording section for encrypting the first key using conditions for replaying the content and a second key and recording the first encrypted key;
a first replaying section for reading the conditions for replaying the content and the first encrypted key and decrypting the first encrypted key using the conditions for replaying the content and the second key;
a second replaying section for reading the encrypted content and decrypting the encrypted content using the first key decrypted by the first replaying section; and
a first control section for updating the conditions for replaying the content based on the result replaying the content by the second replaying section and encrypting the first key decrypted by the first replaying section to the first encrypted key again using updated conditions for replaying the content.

8. An information recording/replaying apparatus according to claim 7, wherein the encrypted content by the first recording section and the first encrypted key by the second recording section are recorded to a first recording medium.

9. An information recording/replaying apparatus according to claim 7, wherein the conditions for replaying the content includes at least one of information showing segment or position of the content and information showing the number of replayable times of the content.

10. An information recording/replaying apparatus according to claim 7, wherein the first control section encrypts the first key decrypted by the first replaying section to the first encrypted key again using updated conditions for replaying the content and a third key instead of the second key.

11. An information recording/replaying apparatus according to claim 7, wherein the first recording section generates position information of the content and encrypts the content using the first key and the position information, and the second replaying section decrypts the encrypted content using the first key decrypted by the first replaying section and the position information.

12. An information recording/replaying apparatus according to claim 7, further comprising; when the content is stream data including time information, a third control section for comparing information showing a replaying request position of the stream data with the time information included in the stream data decrypted by the second replaying section so that an output of the stream data can be limited.

13. An information recording/replaying method comprising:
- encrypting a content with a first key;
- recording the encrypted content;
- encrypting the first key using conditions for replaying the content and a second key;
- recording the first encrypted key;
- reading the conditions for replaying the content and the first encrypted key;
- decrypting the first encrypted key using the conditions for replaying the content and the second key;
- reading the encrypted content;
- decrypting the encrypted content using the first key decrypted by the decrypting the first encrypted key;
- updating the conditions for replaying the content based on the result replaying the content; and
- encrypting the first key again using updated conditions for replaying the content.

14. An information recording/replaying method according to claim 13, wherein the encrypted content with the first key and the first encrypted key by the encrypting the first key are recorded to a first recording medium.

15. An information recording/replaying method according to claim 13, wherein the conditions for replaying the content includes at least one of information showing segment or position of the content and information showing the number of replayable times of the content.

16. An information recording/replaying method according to claim 13, wherein the encrypting encrypts the first key using updated conditions for replaying the content and a third key instead of the second key.

17. An information recording/replaying method according to claim 13, wherein the encrypting encrypts the content using the first key and the position information, and the decrypting decrypts the encrypted content using the first key and the position information.

18. An information recording/replaying apparatus method to claim 13, further comprising; when the content is stream data including time information, comparing information showing a replaying request position of the stream data with the time information included in the stream data decrypted by the decrypting the content so that an output of the stream data can be limited.

* * * * *